US008422126B2

(12) United States Patent
Carlson et al.

(10) Patent No.: US 8,422,126 B2
(45) Date of Patent: Apr. 16, 2013

(54) CRYSTALLINE INFRARED REFLECTIVE FILMS

(75) Inventors: Steven Allen Carlson, Cambridge, MA (US); David W. Avison, Townsend, MA (US); Ifenna Kingsley Anakor, East Boston, MA (US); Greg Robert Farrell, Sudbury, MA (US); Samuel Lim, Lynn, MA (US); Richard D'Amato, South Hadley, MA (US)

(73) Assignees: Madico, Inc., Woburn, MA (US); Optodot Corporation, Watertown, MA (US)

( * ) Notice: Subject to any disclaimer, the term of this patent is extended or adjusted under 35 U.S.C. 154(b) by 0 days.

(21) Appl. No.: 13/096,327

(22) Filed: Apr. 28, 2011

(65) Prior Publication Data

US 2012/0050848 A1    Mar. 1, 2012

Related U.S. Application Data

(63) Continuation-in-part of application No. PCT/US2009/005847, filed on Oct. 28, 2009, and a continuation-in-part of application No. PCT/US2009/005848, filed on Oct. 28, 2009, and a continuation-in-part of application No. PCT/US2009/005849, filed on Oct. 28, 2009.

(60) Provisional application No. 61/200,094, filed on Nov. 24, 2008, provisional application No. 61/200,054, filed on Nov. 24, 2008, provisional application No. 61/200,095, filed on Nov. 24, 2008, provisional application No. 61/197,553, filed on Oct. 28, 2008.

(51) Int. Cl.
*F21V 9/04* (2006.01)

(52) U.S. Cl.
USPC ........................................ 359/359; 428/195.1

(58) Field of Classification Search ............... 428/195.1; 359/359
See application file for complete search history.

(56) References Cited

U.S. PATENT DOCUMENTS

| | | | |
|---|---|---|---|
| 4,048,428 A | 9/1977 | Baird, Jr. et al. | |
| 5,605,732 A | 2/1997 | Mihara et al. | |
| 5,925,453 A | 7/1999 | Kase et al. | |
| 6,049,419 A | 4/2000 | Wheatley et al. | |
| 6,316,264 B1 | 11/2001 | Corey et al. | |
| 6,528,156 B1 | 3/2003 | Takizawa et al. | |
| 6,630,521 B2 | 10/2003 | Cyr et al. | |
| 6,790,590 B2 | 9/2004 | Collins et al. | |
| 6,811,841 B1 | 11/2004 | Castiglione et al. | |
| 7,057,805 B2 | 6/2006 | Phillips et al. | |
| 7,151,626 B2 | 12/2006 | Carlson | |
| 7,352,680 B2 | 4/2008 | Yamada et al. | |
| 2005/0041281 A1 | 2/2005 | Aoyama et al. | |
| 2007/0048519 A1 | 3/2007 | Anderson et al. | |
| 2007/0097510 A1* | 5/2007 | Carlson | 359/589 |
| 2007/0256782 A1 | 11/2007 | Haldeman et al. | |
| 2008/0115833 A1 | 5/2008 | Carlson | |
| 2008/0136160 A1 | 6/2008 | Leenders | |
| 2008/0138289 A1 | 6/2008 | Goronkin et al. | |
| 2010/0104817 A1 | 4/2010 | Carlson | |

OTHER PUBLICATIONS

"UV-radiation curing of vinyl ether-based coating," Decker et al., Surface Coatings International, 2000, vol. 84, No. 4, p. 173-180.*
International Search Report and Written Opinion received in International Patent Application No. PCT/US 09/05847, Jan. 29, 2010, 9 pages.
International Search Report and Written Opinion received in International Patent Application No. PCT/US 09/05848, Feb. 2, 2010, 9 pages.
International Search Report and Written Opinion received in International Patent Application No. PCT/US 09/05849, Feb. 23, 2010, 9 pages.
International Publication No. WO2010/062337, International Publication Date: Jun. 3, 2010, Title: Crystalline Infrared Reflective Films, Steven A. Carlson, et al., 22 pages.
International Publication No. WO2010/062339, International Publication Date: Jun. 3, 2010, Title: Stable Infrared Reflective Films, Steven A. Carlson, et al., 25 pages.
International Publication No. WO2010062338, International Publication Date: Jun. 3, 2010, Title: Solar Control Window Films With Infrared Reflective Layers, Steven A. Carlson, et al., 25 pages.
International Search Report received in International Patent Application No. PCT/US 09/05850, Jan. 11, 2010, 3 pages.
International Publication No. WO2010062340, International Publication Date: Jun. 3, 2010, Title: Stable Infrared Films, Steven A. Carlson, 18 pages.

* cited by examiner

*Primary Examiner* — Mark Ruthkosky
*Assistant Examiner* — Ian Rummel
(74) *Attorney, Agent, or Firm* — Finch & Maloney PLLC

(57) ABSTRACT

Provided are infrared reflective films comprising a substrate and at least one infrared reflective layer comprising an aminium radical cation compound in a crystalline state and an organic polymer, wherein the infrared reflective layer has a reflectance peak in the infrared region from 1250 nm to 1700 nm. Such infrared films are stable in their optical properties against degradation by light and moisture. Also provided are solar control window films, security markings, and other optical articles comprising such infrared reflective films. Further provided are methods for making such infrared reflective films.

22 Claims, No Drawings

CRYSTALLINE INFRARED REFLECTIVE FILMS

RELATED APPLICATIONS

The present application is a continuation-in-part of and claims the benefit of and priority to PCT Application No. PCT/US2009/005847, filed Oct. 28, 2009, which claims the benefit under 35 U.S.C. §119(e) of U.S. Provisional Patent Application No. 61/200,094, filed Nov. 24, 2008, and U.S. Provisional Patent Application No. 61/200,054, filed Nov. 24, 2008, and U.S. Provisional Patent Application No. 61/200,095, filed Nov. 24, 2008, and U.S. Provisional Patent Application No. 61/197,553, filed Oct. 28, 2008. The present application is also a continuation-in-part of and claims the benefit of and priority to PCT Application No. PCT/US2009/005848, filed Oct. 28, 2009, which claims the benefit under 35 U.S.C. §119(e) of U.S. Provisional Patent Application No. 61/200, 094, filed Nov. 24, 2008, and U.S. Provisional Patent Application No. 61/200,054, filed Nov. 24, 2008, and U.S. Provisional Patent Application No. 61/200,095, filed Nov. 24, 2008, and U.S. Provisional Patent Application No. 61/197, 553, filed Oct. 28, 2008. The present application is also a continuation-in-part of and claims the benefit of and priority to PCT Application No. PCT/US2009/005849, filed Oct. 28, 2009, which claims the benefit under 35 U.S.C. §119(e) of U.S. Provisional Patent Application No. 61/200,094, filed Nov. 24, 2008, and U.S. Provisional Patent Application No. 61/200,054, filed Nov. 24, 2008, and U.S. Provisional Patent Application No. 61/200,095, filed Nov. 24, 2008, and U.S. Provisional Patent Application No. 61/197,553, filed Oct. 28, 2008. The entireties of each of the above-referenced patent applications are incorporated herein by reference.

FIELD OF THE INVENTION

The present invention relates generally to the field of infrared films, and particularly, pertains to infrared reflective films that are stable to heat, light, and humidity and that are very low in color while providing strong infrared reflectance. More specifically, this invention pertains to infrared films comprising at least one infrared reflective layer that comprises an aminium free radical cation compound in a crystalline state and an organic polymer. In some aspects, the infrared reflective layer is in contact with a layer comprising a silicone polymer. The invention also pertains to solar control window films, security markings, and other optical articles comprising the crystalline infrared reflective films of this invention and to methods of making such crystalline infrared reflective films.

In addition, the present invention relates generally to the field of infrared films, and particularly, pertains to solar control window films with infrared reflective layers. More specifically, this invention pertains to solar control window films comprising an infrared reflective film comprising a first transparent substrate, an infrared reflective layer that comprises an aminium free radical cation compound in a crystalline state and an organic polymer, a second transparent substrate on the side of the infrared reflective layer opposite to the first substrate, and an infrared absorbing layer, wherein the infrared reflective layer is interposed between the first substrate and the infrared absorbing layer. This invention also pertains to methods of making such a solar control window film.

BACKGROUND OF THE INVENTION

Some products, such as solar control window films and security markings, would benefit from colorless or nearly colorless layers that have strong reflectance in the infrared region so that the products can reflect or block the infrared region of sunlight or, in the case of security markings, can be read by an infrared scanner or camera, but do not provide enough of a visible image to be easily noticed by humans or detected by a visible scanner or camera. For example, U.S. Pat. No. 7,151,626, to Carlson, and U.S. Pat. Pub. Applic. No. 20070097510, to Carlson et al., describe solar control window films comprising aminium radical cation compounds that exhibit high levels of reflectance in the infrared region while having very little visible color. Also, for example, U.S. Pat. Nos. 6,381,059; 6,589,451; and 7,151,626, all to Carlson, describe infrared layers for security markings that comprise an aminium radical cation compound and are capable of being detected in the infrared region while being invisible or nearly invisible to the human eye or to detection by a visible scanner.

It would be advantageous if such infrared reflective layers were highly stable in the intensity level of their infrared reflectance and in their level of visible coloration upon extended exposure to light, heat, and humidity and, when combined directly with other layers by coating or lamination, retain their level of infrared reflectance and their stability against discoloration or degradation. It would be further advantageous if stable and low color infrared absorbing layers that have too much heat buildup by themselves to be effective in solar control window films, due to the possibility of breaking the window by excessive and rapid heat buildup by the sun, could be utilized in solar control window films.

Solar control window films must typically contain a significant amount of infrared reflectance and not depend primarily on infrared absorption to block the sun's infrared radiation. The disadvantage of blocking sunlight by mainly infrared absorption is that the absorbed sunlight is converted to heat in the solar control window film, and much of this heat diffuses into the building, vehicle, or other structure with the solar control window films on the windows. Infrared reflection has the significant advantage of reflecting the sun's infrared energy back into the atmosphere.

SUMMARY OF THE INVENTION

This invention pertains to crystalline infrared reflective films that are very low in color while providing strong infrared reflectance and stability against degradation by light, heat, and humidity.

Provided are infrared reflective films comprising a substrate and at least one infrared reflective layer comprising an aminium radical cation compound in a crystalline state and an organic polymer, wherein the infrared reflective layer has a reflectance peak in the infrared region from 1250 nm to 1700 nm. Such infrared films are stable in their optical properties against degradation by light and moisture. Also provided are solar control window films, security markings, and other optical articles comprising such infrared reflective films. Further provided are methods for making such infrared reflective films. Additionally provided are infrared reflective films comprising a substrate, an infrared reflective layer of an aminium radical cation compound in a crystalline state and an organic polymer, wherein the infrared reflective layer has a reflectance peak in the infrared region from 1250 nm to 1700 nm, and a layer comprising a silicone polymer that is in contact with the infrared reflective layer. The infrared reflective films may comprise a second substrate and the silicone polymer is a pressure sensitive adhesive that is utilized to laminate the first and second substrates together with the infrared reflective layer and the layer comprising a silicone polymer interposed between the two substrates. Such infrared films are stable in their optical properties against degradation by light and moisture. Also provided are solar control window films, security markings, and other optical articles comprising such infrared reflective films. Also provided are methods for making such infrared reflective films.

Also provided are solar control window films comprising an infrared reflective film comprising a first transparent substrate, an infrared reflective layer comprising an aminium radical cation compound in a crystalline state and an organic polymer, a second transparent substrate, and an infrared absorbing layer, wherein the infrared reflective layer is interposed between the first substrate and the infrared absorbing layer so that solar radiation is received first by the infrared reflecting layer before reaching the infrared absorption layer. Preferably, the first and second substrates are laminated together with a silicone pressure sensitive adhesive. Also provided are methods for making such solar control window films.

One aspect of this invention pertains to an infrared reflective film comprising a substrate and at least one infrared reflective layer, wherein the at least one infrared reflective layer comprises an aminium radical cation compound in a crystalline state and an organic polymer, wherein the at least one infrared reflective layer has a reflectance peak in the infrared region from 1250 nm to 1700 nm. In one embodiment, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation.

In one embodiment of the infrared reflective films of the present invention, the at least one infrared reflective layer exhibits an absorption peak in the range of 800 to 900 nm. In one embodiment, the absorption of the at least one infrared reflective layer in the range of 420 to 680 nm is less than 20% of the absorption at the absorption peak in the range of 800 to 900 nm and, preferably, is less than 10% of the absorption at an absorption peak in the range of 830 to 860 nm.

Another aspect of the infrared reflective films of this invention pertains to the at least one infrared reflective layer comprising an aminium radical cation compound in a crystalline state and an organic polymer selected from the group consisting of an aliphatic urethane polymer, a divinyl ether polymer, a fluoropolymer, and a silicone polymer. In one embodiment, the divinyl ether polymer is selected from the group of polymers of the divinyl ethers of ethylene glycol, diethylene glycol, triethylene glycol, tetraethylene glycol, 1,4-butanediol, and 1,4-cyclohexanedimethanol. In one embodiment, the fluoropolymer is a polyvinylidene fluoride. In one embodiment, the silicone polymer is a dimethylpolysiloxane. In one embodiment, the at least one infrared reflective layer comprises an aliphatic urethane polymer and a divinyl ether polymer.

Another aspect of the infrared reflective films of the present invention relates to the substrate comprising a transparent substrate, preferably a transparent polyester film.

One aspect of the infrared reflective films of this invention pertains to solar control window films comprising the infrared reflective films of the present invention. In one embodiment, the solar control window films comprise a substrate comprising a transparent polyester film, an infrared reflective layer comprising an aminium radical cation compound in a crystalline state and an organic polymer, wherein the crystalline state is characterized by the presence of crystals of the aminium radical cation compound and by a shift of one or more low percent transmittance peaks in the infrared spectrum of the aminium radical cation compound in the crystalline state by at least 100 nm to the long wavelength side from the minimum percent transmittance peak of the infrared spectrum of the aminium radical cation compound in a state of single, non-crystallized molecules in a $10^{-5}$M solution in 2-butanone. In one embodiment, the crystalline state is further characterized by a shift of one or more low percent transmittance peaks in the infrared spectrum of the aminium radical cation compound in the crystalline state by at least 50 nm to the short wavelength side from the minimum percent transmittance peak of the infrared spectrum of the aminium radical cation compound in a state of single, non-crystallized molecules in a $10^{-5}$M solution in 2-butanone. In one embodiment, the infrared reflective films exhibit a reflectance peak in the infrared region from 1250 nm to 1700 nm.

In still another aspect of the solar control window films of this invention comprising infrared reflective films, the thickness of the infrared reflective layer is 0.01 to 0.1 microns. In one embodiment, the average width and depth of the crystals of the aminium radical cation compound are less than the thickness of the infrared reflective layer. In one embodiment, the average length of the crystals of the aminium radical cation compound is greater than the thickness of the infrared reflective layer.

In another aspect of the solar control window films of this invention comprising infrared reflective films, the thickness of the infrared reflective layer is 0.1 to 0.3 microns. In one embodiment, the average width and depth of the crystals of the aminium radical cation compound are less than the thickness of the infrared reflective layer. In one embodiment, the average length of the crystals of the aminium radical cation compound is greater than the thickness of the infrared reflective layer.

In a further aspect of the solar control window films of the present invention, the percent haze of the window films is less than 3 percent, and preferably less than 2 percent.

In another aspect of the solar control window films of this invention, the infrared reflective layer comprises from 70 percent to 99 percent by weight of the aminium radical cation compound.

In another aspect of the solar control window films of the present invention, the maximum infrared reflectance peak of the infrared reflective layer is greater than 20 percent reflectance, and preferably greater than 30 percent reflectance. In one embodiment, the maximum infrared reflectance peak of the infrared reflective layer is in the infrared region from 1250 nm to 1400 nm.

One aspect of the infrared reflective films of this invention pertains to security markings comprising the infrared reflective films of the present invention.

One aspect of the infrared reflective films of this invention pertains to an optical article comprising the infrared reflective films of the present invention. In one embodiment, the infrared reflective film comprises a laser imaged pattern on at least one of the at least one infrared reflective layer comprising the aminium radical cation compound in a crystalline state, wherein the infrared absorption of the aminium radical cation compound is changed by exposure to the laser and the laser imaged pattern is readable in the infrared region. In one embodiment, the laser imaged pattern is readable in the eye-safe region above 1400 nm.

Another aspect of the present invention relates to methods of making an infrared reflective film, wherein the method comprises the steps of providing (a) a substrate, (b) an infrared reflective first layer overlying the substrate, wherein the infrared reflective layer comprises an aminium radical cation compound in a crystalline state and an organic polymer, wherein the crystalline state is characterized by the presence of crystals of the aminium radical cation compound and by a shift of one or more low percent transmittance peaks in the infrared spectrum of the aminium radical cation compound in the crystalline state by at least 100 nm to the long wavelength side from the minimum percent transmittance peak of the infrared spectrum of the aminium radical cation compound in a state of single, non-crystallized molecules in a $10^{-5}$M solution in 2-butanone.

This invention pertains to solar control window films that have significant infrared reflectance while utilizing infrared absorbing layers having low color and high stability but little or no infrared reflectance.

One aspect of this invention pertains to a solar control window film comprising an infrared reflective film comprising (a) a first transparent substrate, (b) an infrared reflective layer comprising an aminium radical cation compound in a crystalline state and an organic polymer, wherein the maximum reflectance peak of the infrared reflective layer from 1250 nm to 1700 nm exhibits greater than 20 percent reflectance, (c) a second transparent substrate, wherein the second substrate is on the side of the infrared reflective layer opposite to the first substrate, and (d) an infrared absorbing layer comprising an infrared absorbing compound, wherein the maximum infrared reflectance peak of the infrared absorbing layer exhibits less than 10 percent reflectance, and wherein the infrared reflective layer is interposed between the first substrate and the infrared absorbing layer. In one embodiment, the maximum infrared reflectance peak of the infrared absorbing layer exhibits less than 5 percent reflectance. In one embodiment, the window film further comprises a polymer layer, wherein the polymer layer comprises a silicone polymer and is in contact with the infrared reflective layer on a first surface of the polymer layer. In one embodiment, the first substrate and the second substrate are laminated together and the infrared reflective layer and the polymer layer are interposed between the first and the second substrates. In one embodiment, the silicone polymer comprises a silicone pressure sensitive adhesive. In one embodiment, the infrared absorbing layer is interposed between the infrared reflective layer and the second substrate. In one embodiment, the infrared absorbing layer is on the side of the second substrate opposite from the infrared reflective layer.

In another aspect of the solar control window films of this invention, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation.

In one embodiment of the solar control window films of the present invention, the infrared reflective layer exhibits an absorption peak in the range of 800 to 900 nm. In one embodiment, the absorption of the infrared reflective layer in the range of 420 to 680 nm is less than 20% of the absorption at the absorption peak in the range of 800 to 900 nm and, preferably, is less than 10% of the absorption at the absorption peak in the range of 800 to 900 nm, and, more preferably, is less than 10% of the absorption at an absorption peak in the range of 830 to 860 nm.

Another aspect of the solar control window films of this invention pertains to the infrared reflective layer comprising an aminium radical cation compound in a crystalline state, wherein the organic polymer is selected from the group consisting of an aliphatic urethane polymer, a divinyl ether polymer, a fluoropolymer, and a silicone polymer. In one embodiment, the divinyl ether polymer is selected from the group of polymers of the divinyl ethers of ethylene glycol, diethylene glycol, triethylene glycol, tetraethylene glycol, 1,4-butanediol, and 1,4-cyclohexanedimethanol. In one embodiment, the fluoropolymer is a polyvinylidene fluoride. In one embodiment, the silicone polymer of the polymer layer comprises a dimethylpolysiloxane. In one embodiment, the silicone pressure sensitive adhesive comprises a dimethylpolysiloxane pressure sensitive adhesive. In one embodiment, the infrared reflective layer further comprises an aliphatic urethane polymer and a divinyl ether polymer.

Another aspect of the solar control window films of the present invention relates to the first substrate comprising a transparent substrate, preferably a transparent polyester film, and, more preferably, a transparent polyester film comprising an ultraviolet light absorbing compound that provides greater than 98 percent absorption in the wavelength region from 310 nm to 370 nm. In one embodiment, the second substrate comprises a transparent substrate, preferably a transparent polyester film.

In one embodiment of the solar control window films of this invention, the crystalline state is characterized by the presence of crystals of the aminium radical cation compound and by a shift of one or more low percent transmittance peaks in the infrared spectrum of the aminium radical cation compound in the crystalline state by at least 100 nm to the long wavelength side from the minimum percent transmittance peak of the infrared spectrum of the aminium radical cation compound in a state of single, non-crystallized molecules in a $10^{-5}$M solution in 2-butanone. In one embodiment, the crystalline state is further characterized by a shift of one or more low percent transmittance peaks in the infrared spectrum of the aminium radical cation compound in the crystalline state by at least 50 nm to the short wavelength side from the minimum percent transmittance peak of the infrared spectrum of the aminium radical cation compound in a state of single, non-crystallized molecules in a $10^{-5}$M solution in 2-butanone.

In still another aspect of the solar control window films of the present invention comprising infrared reflective films with an infrared absorbing layer on the side of the infrared reflective layer opposite to the direction of incidence of solar radiation, the thickness of the first or infrared reflective layer is 0.01 to 0.1 microns. In one embodiment, the average width and depth of the crystals of the aminium radical cation compound are less than the thickness of the first layer. In one embodiment, the average length of the crystals of the aminium radical cation compound is greater than the thickness of the first layer.

In another aspect of the solar control window films of this invention, the thickness of the first or infrared reflective layer is 0.1 to 0.3 microns. In one embodiment, the average width and depth of the crystals of the aminium radical cation compound are less than the thickness of the first layer. In one embodiment, the average length of the crystals of the aminium radical cation compound is greater than the thickness of the first layer.

In a further aspect of the solar control window films of the present invention, the percent haze of the window films is less than 3 percent, and preferably less than 2 percent.

In another aspect of the solar control window films of this invention, the first or infrared reflective layer comprises from 70 percent to 99 percent by weight of the aminium radical cation compound.

In another aspect of the solar control window films of the present invention, the maximum infrared reflectance peak of the first or infrared reflective layer is greater than 20 percent reflectance, and preferably greater than 30 percent reflectance. In one embodiment, the maximum infrared reflectance of the first or infrared reflective layer is in the infrared region from 1250 nm to 1400 nm.

In still another aspect of the solar control window films of this invention, the infrared absorbing layer comprises an infrared absorbing compound selected from the group consisting of aminium radical cation compounds, tin oxides, lanthanum boride, and cesium tungsten oxide. In one embodiment, the infrared absorbing compound is an antimony-doped tin oxide. In one embodiment, the infrared absorbing compound is lanthanum boride. In one embodiment, the infrared absorbing compound is cesium tungsten oxide.

Another aspect of the present invention relates to methods of making a solar control window film, wherein the method comprises the steps of providing (a) a first substrate comprising a transparent polyester film, (b) an infrared reflective layer overlying the first substrate, wherein the first layer comprises an aminium radical cation compound in a crystalline state and an organic polymer, wherein the maximum reflectance peak of the infrared reflective layer from 1250 nm to 1700 nm is greater than 20 percent reflectance, (c) a second substrate comprising a transparent polyester film, wherein the second substrate is on the side of the infrared reflective layer opposite to the first substrate, and (d) an infrared absorbing layer comprising an infrared absorbing compound, wherein the maximum infrared reflectance peak of the infrared absorbing layer is less than 10 percent reflectance, and wherein the infrared reflective layer is interposed between the first substrate and the infrared absorbing layer. In one embodiment, the maximum infrared reflectance peak of the infrared absorbing layer is less than 5 percent reflectance. In one embodiment, the method further comprises the step of providing a polymer layer, wherein the polymer layer comprises a silicone polymer and is in contact with the infrared reflective layer on one surface of the polymer layer. In one embodiment, the method further comprises the step of laminating the first substrate and the second substrate together and the infrared reflective layer and the polymer layer are interposed between the first and the second substrates. In one embodiment, the silicone polymer comprises a silicone pressure sensitive adhesive. In one embodiment, the infrared absorbing layer is interposed between the infrared reflective layer and the second substrate. In one embodiment, the infrared absorbing layer is on the side of the second substrate opposite to the first substrate.

This invention pertains to stable infrared films that are very low in color while providing strong infrared reflectance and stability against degradation by light, heat, and humidity.

One aspect of this invention pertains to an infrared film comprising a first substrate and an infrared reflective layer overlying the first substrate, wherein the infrared reflective layer comprises an aminium radical cation compound in a crystalline state and an organic polymer, wherein the infrared reflective layer has a reflectance peak in the infrared region from 1250 nm to 1700 nm, and wherein the infrared reflective layer is in contact with a layer comprising a silicone polymer. In one embodiment, the silicone polymer comprises a silicone pressure sensitive adhesive. In one embodiment, the infrared reflective film comprises a second substrate, wherein the first substrate and the second substrate are laminated together and the infrared reflective layer and the layer comprising a silicone polymer are interposed between the first and the second substrates, and preferably, the silicone polymer comprises a silicone pressure sensitive adhesive. In one embodiment, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation.

In one embodiment of the infrared reflective films of the present invention, the infrared reflective layer of the infrared film has an absorption peak in the range of 800 to 900 nm. In one embodiment, the absorption of the infrared reflective layer in the range of 420 to 680 nm is less than 20% of the absorption at the absorption peak in the range of 800 to 900 nm and, preferably, is less than 10% of the absorption at an absorption peak in the range of 830 to 860 nm.

Another aspect of the infrared reflective films of this invention pertains to the infrared reflective layer comprising an aminium radical cation compound in a crystalline state and an organic polymer selected from the group consisting of an aliphatic urethane polymer, a divinyl ether polymer, a fluoropolymer, and a silicone polymer. In one embodiment, the divinyl ether polymer is selected from the group of polymers of the divinyl ethers of ethylene glycol, diethylene glycol, triethylene glycol, tetraethylene glycol, 1,4-butanediol, and 1,4-cyclohexanedimethanol. In one embodiment, the fluoropolymer is a polyvinylidene fluoride. In one embodiment, the silicone polymer of the infrared reflective layer is a dimethylpolysiloxane. In one embodiment, the infrared reflective layer comprises an aliphatic urethane polymer and a divinyl ether polymer.

Another aspect of the infrared reflective films of the present invention relates to the layer comprising a silicone polymer that is in contact with the infrared reflective layer, wherein the silicone polymer is a dimethylpolysiloxane.

Another aspect of the infrared reflective films of the present invention relates to the substrate comprising a transparent substrate, preferably a transparent polyester film, and more preferably, a transparent polyester film comprising an ultraviolet absorbing compound that provides greater than 98 percent absorption in the wavelength region from 310 nm to 370 nm.

One aspect of the infrared reflective films of this invention pertains to solar control window films comprising the infrared reflective films of the present invention. In one embodiment, the solar control window films comprise infrared reflective films comprising (a) a first substrate comprising a transparent polyester film, (b) a first layer comprising an aminium radical cation compound in a crystalline state and an organic polymer, (c) a second layer comprising a silicone polymer, wherein the second layer is in contact with the first layer on one surface, and (d) a second substrate comprising a transparent polyester film, wherein the second substrate is on the side of the second layer opposite to the side in contact with the first layer. In one embodiment, the crystalline state is characterized by the presence of crystals of the aminium radical cation compound and by a shift of one or more low percent transmittance peaks in the infrared spectrum of the aminium radical cation compound in the crystalline state by at least 100 nm to the long wavelength side from the minimum percent transmittance peak of the infrared spectrum of the aminium radical cation compound in a state of single, non-crystallized molecules in a $10^{-5}$M solution in 2-butanone. In one embodiment, the crystalline state is further characterized by a shift of one or more low percent transmittance peaks in the infrared spectrum of the aminium radical cation compound in the crystalline state by at least 50 nm to the short wavelength side from the minimum percent transmittance peak of the infrared spectrum of the aminium radical cation compound in a state of single, non-crystallized molecules in a $10^{-5}$M solution in 2-butanone. In one embodiment, the infrared reflective films exhibit a reflectance peak in the infrared region from 1250 nm to 1700 nm.

In still another aspect of the solar control window films of this invention comprising infrared reflective films with a silicone layer, the thickness of the first or infrared reflective layer is 0.01 to 0.1 microns. In one embodiment, the average width and depth of the crystals of the aminium radical cation compound are less than the thickness of the first layer. In one embodiment, the average length of the crystals of the aminium radical cation compound is greater than the thickness of the first layer.

In another aspect of the solar control window films of this invention comprising infrared reflective films with a silicone layer, the thickness of the first or infrared reflective layer is 0.1 to 0.3 microns. In one embodiment, the average width and depth of the crystals of the aminium radical cation compound are less than the thickness of the first layer. In one embodiment, the average length of the crystals of the aminium radical cation compound is greater than the thickness of the first layer.

In a further aspect of the solar control window films of the present invention, the percent haze of the window films is less than 3 percent, and preferably less than 2 percent.

In another aspect of the solar control window films of this invention, the first or infrared reflective layer comprises from 70 percent to 99 percent by weight of the aminium radical cation compound.

In another aspect of the solar control window films of the present invention, the maximum infrared reflectance peak of the first or infrared reflective layer is greater than 20 percent reflectance, and preferably greater than 30 percent reflectance. In one embodiment, the maximum infrared reflectance of the first or infrared reflective layer is in the infrared region from 1250 nm to 1400 nm.

Another aspect of this invention pertains to security markings comprising the infrared reflective films of the present invention.

Still another aspect of this invention pertains to an optical article, which optical article comprises the infrared reflective films of the present invention. In one embodiment, the infrared reflective film comprises a laser imaged pattern in the infrared reflective layer comprising the aminium radical cation compound in a crystalline state, wherein the infrared absorption of the aminium radical cation compound has been changed by exposure to the laser and the laser imaged pattern is readable in the infrared region. In one embodiment, the laser imaged pattern is readable in the eye-safe region above 1400 nm.

Another aspect of the present invention relates to methods of making an infrared reflective film, wherein the method comprises the steps of providing (a) a first substrate comprising a transparent polyester film, (b) a first layer overlying the first substrate, wherein the first layer comprises an aminium radical cation compound in a crystalline state and an organic polymer, (c) a second layer comprising a silicone polymer, wherein the second layer is in contact with the first layer on one surface, and (d) a second substrate comprising a transparent polyester film, wherein the second substrate is on the side of the second layer opposite to the side in contact with the first layer.

As will be appreciated by one of skill in the art, features of one aspect or embodiment of the invention are also applicable to other aspects or embodiments of the invention.

DETAILED DESCRIPTION OF THE INVENTION

Organic Free Radical Compounds

The term "organic free radical compound," as used herein, pertains to an organic compound which comprises at least one free unpaired electron on an atom, such as, for example, a carbon atom, a nitrogen atom, or an oxygen atom, in the ground state of the organic compound. Suitable organic free radical compounds for the infrared reflective films, solar control window films, security markings, and optical articles of the present invention include salts of organic free radical cations. For purposes of brevity, the terms "organic free radical cation," "organic radical cation," and "radical cation" are used interchangeably herein. The word "cation," as used herein, pertains to a positively charged atom in a molecule, such as, for example, a positively charged nitrogen atom. It should be noted that the free unpaired electron and the positive charges of the organic free radical compounds may be localized on a single atom or shared among more than one atom.

Examples of suitable salts of organic free radical cations for the infrared reflective films, solar control window films, security markings, and optical articles of this invention include, but are not limited to, salts of aminium radical cation compounds, such as, for example, tris(p-dibutylaminophenyl)aminium hexafluoroantimonate, which is commercially available as IR-99, a trade name for a dye available from Sperian Protection, Smithfield, R.I. Another suitable salt of an aminium radical cation compound is IR-165, which is a trade name for a dye available from Sperian Protection, Smithfield, R.I. IR-165 is the hexafluoroantimonate salt of a tetrakis(phenyl)-1,4-benzenediamine radical cation.

Coatings comprising aminium radical cation compounds have been found to exhibit high levels of reflectance in the infrared, as described in U.S. Pat. No. 7,151,626 to Carlson and in U.S. Pat. Pub. Applic. No. 20070097510, to Carlson et al. Layers comprising IR-165 type compounds have a much lower absorption in the 400 to 700 nm wavelength region of the visible than do IR-99 type compounds for a comparable amount of infrared blocking, and thus are preferred for product applications where strong infrared absorption and blocking is desired with no or very little visible color.

The terms "infrared" and "infrared region" are used interchangeably herein and pertain to wavelengths form 700 nm to 2500 nm. The terms "visible wavelength region," "visible wavelength," visible region," and "visible" are used interchangeably herein and pertain to wavelengths from 400 nm to 700 nm.

Suitable salts of organic radical cation compounds for the infrared reflective films of this invention include, but are not limited to, salts of an aminium radical cation compound. The choice of the counteranion for the salt depends on a variety of factors such as, for example, the ease and cost of applying the infrared reflective layer and the required stability of the infrared reflective layers where the organic radical cation salt is utilized, against degradation by oxygen, moisture, and photon exposures.

Chart 1.

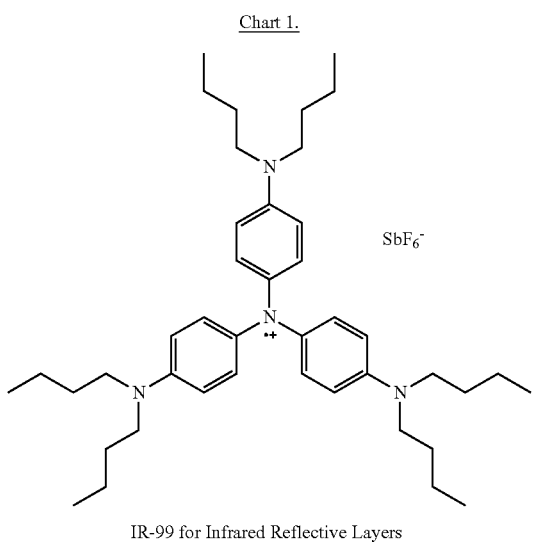

IR-99 for Infrared Reflective Layers

Chart 1 shows the chemical structure of IR-99, a representative free radical compound for the infrared reflective layers of this invention. IR-99 is an example of a salt of a tris(4-dialkylaminophenyl)aminium radical cation.

It can be seen in Chart 1 that IR-99 is an organic free radical compound with a single free electron shown on one of the nitrogen atoms. It is present in a salt form with a hexafluoroantimonate anion in this case.

In one embodiment of the infrared films of this invention, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation, such as IR-165. In one embodiment, the aminium radical cation compound is a salt of a tris(phenyl)-aminium radical cation, such as IR-99.

Infrared Reflective Films for Solar Control Window Films, Security Markings, and Optical Articles This invention pertains to stable infrared reflective films that are very low in color while providing strong infrared reflectance. As used herein, the words "film" or "films" pertain to any article or product that comprises at least one layer that is on a clear or an opaque film substrate such as, for example, a white polyethylene terephthalate, herein called polyester, film, a clear polyester film, a white polystyrene film, a clear polypropylene film, and a white polyvinyl chloride (PVC) film). For example, the infrared reflective films of this invention include configurations where a plastic or polymer film is coated or laminated on a paper, a metal, a glass, or another plastic film. In some aspects of the invention, an infrared reflective layer is in contact with a layer comprising a silicone polymer.

One aspect of this invention pertains to an infrared reflective film comprising a substrate and at least one infrared reflective layer, wherein the at least one infrared reflective layer comprises an aminium radical cation compound in a crystalline state and an organic polymer, wherein the at least one infrared reflective layer has a reflectance peak in the infrared region from 1250 nm to 1700 nm. In one embodiment, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation.

The crystalline state of the aminium radical cation compound, instead of any of its non-crystallized states, provides additional stability to the optical properties of the infrared film under storage conditions and under extended exposure to heat, light, and moisture. The crystalline state of the aminium radical cation compound means that the aminium radical cation compound has formed crystals in the infrared reflective layer. These crystals can be observed under a high power microscope or, in the case of clear transparent infrared films, can also be seen by an increase in the percent haze due to the formation of crystals. The crystalline state of the aminium radical cation compound, such as IR-165, can be formed by extended heating of the infrared reflective layer at high temperatures, such as at 130° C., or by including a high boiling solvent, such as 2,4-pentanedione, with limited solubility for the aminium radical cation compound in the coating formulation. This high boiling solvent causes the aminium radical cation compound to precipitate out or crystallize in the last stages of drying, thereby forming the aminium radical cation compound in a crystalline state in the infrared reflective layer.

Besides increased stability to light and to other environmental aging conditions, other benefits of having the crystalline state of the aminium radical cation compound in the infrared reflective layer are higher percent reflectance in the infrared, such as 35% reflectance compared to 20% reflectance in the non-crystallized state; a lower amount of aminium radical cation compound required to obtain at least a 20% reflectance, such as one-third the amount needed in the non-crystallized state; a different and broader infrared reflectance spectrum, such as a broad and intense peak at about 1300 nm and another peak in the 800 nm to 900 nm region, compared to a narrower and less intense infrared reflectance spectrum centered around the 800 nm to 1100 nm region in the non-crystalline state; a much greater retention of its percent infrared reflectance when more organic polymer is added to the infrared reflective layer or when another coating layer is coated or laminated to the infrared reflective layer, such as adding up to 90% polymer to the infrared reflective layer or overcoating with a pressure sensitive adhesive layer, compared to the loss of nearly all infrared reflectance with 15% added polymer or significantly reduced infrared reflectance with overcoating, in the case of the non-crystalline state.

In one embodiment of the infrared reflective films of the present invention, the at least one infrared reflective layer of the infrared film has an absorption peak in the range of 800 to 900 nm. This is a typical infrared wavelength range for detection by infrared scanners or cameras, and 700 to 900 nm is the most intense part of the infrared spectrum of sunlight where it is desirable to have energy control or blocking to reduce the heat buildup in the interior of the building or vehicle. In one embodiment, the absorption of the at least one infrared reflective layer of the infrared film in the range of 420 to 680 nm is less than 20% of the absorption at the absorption peak in the range of 800 to 900 nm and, preferably, is less than 10% of the absorption at the absorption peak in the range of 800 to 900 nm, and more preferably, is less than 10% of the absorption at an absorption peak in the range of 830 to 860 nm. IR-165 type aminium radical cation compounds in a crystalline state are particularly suitable for meeting and maintaining these desired absorption properties.

Another aspect of the infrared reflective films of this invention pertains to the at least one infrared reflective layer comprising an aminium radical cation compound in a crystalline state and an organic polymer selected from the group consisting of an aliphatic urethane polymer, a divinyl ether polymer, a fluoropolymer, and a silicone polymer. In one embodiment, the divinyl ether polymer is selected from the group of polymers of the divinyl ethers of ethylene glycol, diethylene glycol, triethylene glycol, tetraethylene glycol, 1,4-butanediol, and 1,4-cyclohexanedimethanol. While not wishing to be bound by a particular theory, it is believed that the aminium radical cation compound with its cationic groups catalyzes the cationic polymerization of the monomer of divinyl ether compounds to form a polymer of the divinyl ether compounds. One approach to provide the divinyl ether polymer is to include the monomer of the divinyl ether polymer compound in the coating formulation of the aminium radical cation compound and organic solvents, such as 2-butanone and cyclohexanone, to make the infrared reflective layer and retaining a portion of the divinyl ether compound in a polymer state after drying and heating the layer, while some of the monomer is volatilized and removed during the drying and heating. In one embodiment, the at least one infrared reflective layer comprises an aliphatic urethane polymer such as, for example, IROCOAT CA-239, the trade name for an aliphatic urethane polymer available from Huntsman Corporation. The aliphatic urethane polymer adds cohesive and adhesive strength to the infrared reflective layer. In one embodiment, the at least one infrared reflective layer comprises a fluoropolymer such as, for example, Kynar 9037, a trade name for a polyvinylidene fluoride polymer available from Dupont Corporation, Wilmington, Del. The fluoropolymer adds resistance to moisture that increases the stability of the infrared reflective layer. The fluoropolymer also improves the flow properties and uniformity of the coating of the infrared reflective layer. In one embodiment, the at least one infrared reflective layer comprises a silicone polymer such as a dimethylpolysiloxane. The silicone polymer adds resistance to moisture that increases the stability of the infrared reflective layer. The silicone polymer also improves the flow properties and uniformity of the coating of the infrared reflective layer. In one embodiment, the at least one infrared reflective layer comprises a combination of two or more organic polymers selected from the group consisting of an aliphatic urethane polymer, a divinyl ether polymer, a fluoropolymer, and a silicone polymer.

Another aspect of the infrared films of the present invention relates to the substrate comprising a transparent substrate, preferably a transparent polyester film. In one embodiment, the substrate comprises a reflective opaque substrate, preferably a white polyester film such as, for example, MELINEX 339, a trade name for a polyester film from Dupont Corporation, Wilmington, Del., that comprises barium sulfate pigment particles that reflect infrared and visible radiation. The reflective opaque substrate is useful in providing a background of high infrared reflectance against which the infrared film with its blocking and reflectance of the infrared radiation in the initial pass through the layer comprising the aminium radical cation compound and in the return pass through this layer after reflecting off of the substrate, can be readily detected by an infrared scanner or camera, even at very low amounts of the aminium compound in the infrared reflective layer, such as less than 0.05 g/m$^2$.

One aspect of the infrared reflective films of this invention pertains to solar control window films comprising the infrared reflective films of the present invention. In one embodiment, the solar control window films comprise an infrared reflective film comprising a substrate comprising a transparent polyester film, an infrared reflective layer comprising an aminium radical cation compound in a crystalline state and an organic polymer, wherein the crystalline state is characterized by the presence of crystals of the aminium radical cation compound and by a shift of one or more low percent transmittance peaks in the infrared spectrum of the aminium radical cation compound in the crystalline state by at least 100 nm to the long wavelength side from the minimum percent transmittance peak of the infrared spectrum of the aminium radical cation compound in a state of single, non-crystallized molecules in a 10$^{-5}$M solution in 2-butanone. In one embodiment, the crystalline state is further characterized by a shift of one or more low percent transmittance peaks in the infrared spectrum of the aminium radical cation compound in the crystalline state by at least 50 nm to the short wavelength side from the minimum percent transmittance peak of the infrared spectrum of the aminium radical cation compound in a state of single, non-crystallized molecules in a 10$^{-5}$M solution in 2-butanone. For example, with IR-165 as the aminium radical cation compound, the infrared reflective layer typically exhibits a large broad minimum transmittance peak at about 1300 nm and a more narrow minimum transmittance peak at about 850 nm. IR-165 in a state of single, non-crystallized molecules in a 10$^{-5}$M solution in 2-butanone or in a non-crystalline coating layer exhibits a single minimum transmittance peak at about 950 nm. Thus, the crystalline state for an infrared reflective coating comprising the IR-165 type of aminium radical cation compound typically has minimum transmittance peaks at about 850 nm and 1300 nm, or about 100 nm to the short wavelength side and 350 nm to the long wavelength side from the minimum transmittance peak in the infrared spectrum of the IR-165 in a solution or in a coating layer where the IR-165 is in a state of single, non-crystallized molecules. In one embodiment, the infrared reflective films exhibit a reflectance peak in the infrared region from 1250 nm to 1700 nm.

The solar control window films of this invention may have any of the design configurations known in the art for solar control window films. For example, the substrate may have a mounting adhesive layer coated on the side of a first substrate opposite to the infrared reflective layer. Upon wetting with water, this mounting adhesive layer may be utilized to mount or adhere the window film to a window. The non-metallic nature of the infrared reflective layers of this invention have an advantage of allowing the water to diffuse and dry much more rapidly than window films that have metallized layers that are much less permeable to water. Also, for example, the infrared reflective layer may be laminated to a second substrate by utilizing a pressure sensitive adhesive. This provides additional protection against handling and environmental damage to the infrared reflective layer which is then encapsulated between two substrates rather than being directly exposed in the inside of the building, automobile, or whatever structure to which the window film is attached. For added protection of the solar control window film against scratching or other types of damage to the optical clarity, the opposite side of this second substrate may be coated with an abrasion resistant coating, such as, for example, an UV-cured crosslinked acrylic coating. The order of the coating layers between the two substrates is optional. For example, the infrared reflective layer may be coated on the second substrate or coated on both the first and the second substrates, and the pressure sensitive adhesive layer may be interposed between the first substrate and the infrared reflective layer on the second substrate.

In still another aspect of the solar control window films of this invention comprising infrared reflective films, the thickness of the infrared reflective layer is 0.01 to 0.1 microns. In one embodiment, the average width and depth of the crystals of the aminium radical cation compound are less than the thickness of the infrared reflective layer. In one embodiment, the average length of the crystals of the aminium radical cation compound is greater than the thickness of the infrared reflective layer. The dimensions of the crystals may be measured under a high power microscope or, even more accurately, by a scanning electron microscope (SEM). The thickness of the infrared reflective coating may be measured by cross-sectioning the infrared reflective layer and the substrate and then measuring the thickness using a SEM. This cross-sectioning process also provides measurements on the depth and the length of the crystals, as well as measuring the depth or thickness of the infrared reflective layer.

In another aspect of the solar control window films of this invention comprising infrared reflective films, the thickness of the infrared reflective layer is 0.1 to 0.3 microns. In one embodiment, the average width and depth of the crystals of the aminium radical cation compound are less than the thickness of the infrared reflective layer. In one embodiment, the average length of the crystals of the aminium radical cation compound is greater than the thickness of the infrared reflective layer.

In a further aspect of the solar control window films of the present invention, the percent haze of the window films is less than 3 percent, and preferably less than 2 percent. The formation of crystals of the aminium radical cation compound increases the haze of the coating since typically at least one of the dimensions of the crystals is 0.2 micron or higher. Although the percent haze in darker, less visibly transparent window films, such as those with a visible light transmittance below about 60%, is less noticeable, a haze level above about 3 percent is undesirable in low color window films with a visible light transmittance above about 60%. To minimize the haze level, the thickness of the infrared reflective layer may be reduced to make the sizes of the crystals lower. Also, for lower haze, it is preferable to form the crystals during the initial drying step for the infrared reflective layer, such as by a solvent-induced crystallization, rather then forming the crystals by a post-heating process. Another approach to lowering the haze is to put an overcoating or laminate a layer, such as a pressure sensitive adhesive layer, on the infrared reflective layer. A combination of these approaches may be used to obtain a lower haze level.

In another aspect of the solar control window films of this invention, the infrared reflective layer comprises from 70 percent to 99 percent by weight of the aminium radical cation compound in a crystalline state. In one embodiment, the infrared reflective layer comprises 10 to 70 percent by weight of the aminium radical cation compound in a crystalline state. The remainder of the infrared reflective layer may be one or more organic polymers. The crystalline state of the aminium radical cation compound allows a large weight percent of organic polymers and other coating materials to be combined with the aminium radical cation compound without significantly reducing the infrared reflectance, whereas typically not more than 15 percent by weight of polymers and other additives may be added to the non-crystalline state of the same aminium radical cation compound without eliminating most of the infrared reflectance of the layer.

In another aspect of the solar control window films of the present invention, the maximum infrared reflectance peak of the infrared reflective layer is greater than 20 percent reflectance, and preferably greater than 30 percent reflectance. In one embodiment, the maximum infrared reflectance of the infrared reflective layer is in the infrared region from 1250 nm to 1400 nm.

Another aspect of this invention pertains to security markings comprising the infrared reflective films of the present invention. In one embodiment, the security markings comprise an infrared reflective film comprising a substrate and at least one infrared reflective layer, wherein the at least one infrared reflective layer comprises an aminium radical cation compound in a crystalline state and an organic polymer, and wherein the at least one infrared reflective layer has a reflectance peak in the infrared region from 1250 nm to 1700 nm.

Still another aspect of this invention pertains to an optical article comprising the infrared reflective films of the present invention. In one embodiment, the optical article comprises an infrared reflective film comprising a substrate and at least one infrared reflective layer, wherein the at least one infrared reflective layer comprises an aminium radical cation compound in a crystalline state and an organic polymer, and wherein the at least one infrared reflective layer has a reflectance peak in the infrared region from 1250 nm to 1700 nm. Optical articles include, but are not limited to, solar control window films, security markings and security marking systems, test strips for analysis of fluids, photovoltaic cells, infrared blocking films for outdoor kiosks and other displays, transparent credit cards, infrared filters, and other applications where the article may be detected or utilized optically in the infrared region. In one embodiment, the infrared reflective film comprises a laser imaged pattern on at least one of the at least one infrared reflective layer comprising the aminium radical cation compound, wherein the infrared absorption of the aminium radical cation compound has been changed by exposure to a laser and the laser imaged pattern is readable in the infrared region. Typically, the laser is an infrared laser, such as, for example, a semiconductor diode laser emitting at 830 nm or a YAG laser emitting at 1065 nm. In one embodiment, the laser imaged pattern is readable in the eye-safe region above 1400 nm. This broad infrared range for detection from 700 nm to 1600 nm, and higher depending on the choice of the aminium radical cation compound, is useful in providing an option for reading the infrared film at an eye-safe wavelength so that, for example, it could be read with an infrared laser device at a store checkout counter or in a crowded room without concern about harming any of the people present.

Another aspect of the present invention relates to a method of making an infrared reflective film, wherein the method comprises the steps of providing (a) a substrate, (b) an infrared reflective layer overlying the substrate, wherein the infrared reflective layer comprises an aminium radical cation compound in a crystalline state and an organic polymer, wherein the crystalline state is characterized by the presence of crystals of the aminium radical cation compound and by a shift of one or more low percent transmittance peaks in the infrared spectrum of the aminium radical cation compound in the crystalline state by at least 100 nm to the long wavelength side from the minimum percent transmittance peak of the infrared spectrum of the aminium radical cation compound in a state of single, non-crystallized molecules in a $10^{-5}$M solution in 2-butanone and wherein the infrared reflective layer has a reflectance peak in the infrared region from 1250 nm to 1700 nm.

Silicone Polymers

One aspect of this invention pertains to an infrared reflective film comprising a first substrate and an infrared reflective layer overlying the first substrate, wherein the infrared reflective layer comprises an aminium radical cation compound in a crystalline state and an organic polymer, wherein the infrared reflective layer has a reflectance peak in the infrared region from 1250 nm to 1700 nm, and wherein the infrared reflective layer is in contact with a layer comprising a silicone polymer. In one embodiment, the silicone polymer comprises a silicone pressure sensitive adhesive. In one embodiment, the infrared reflective film comprises a second substrate, wherein the first substrate and the second substrate are laminated together and the infrared reflective layer and the layer comprising a silicone polymer are interposed between the first and the second substrates, and preferably, the silicone polymer comprises a silicone pressure sensitive adhesive. In one embodiment, the weight percent of silicone polymer in the layer comprising a silicone polymer is greater than 20%, and preferably greater than 90%. In one embodiment, the silicone polymer in the layer comprising a silicone polymer comprises a dimethylpolysiloxane, and preferably the dimethylpolysiloxane is a pressure sensitive adhesive.

In another aspect of the infrared reflective films of this invention, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation.

Besides increased stability to light and to other environmental aging conditions, other benefits of having the crystalline state of the aminium radical cation compound in the infrared reflective layer, and having the infrared reflective layer in contact with a layer comprising a silicone polymer, are higher percent reflectance in the infrared, such as 35% reflectance compared to 20% reflectance in the non-crystallized state; a lower amount of aminium radical cation compound required to obtain at least a 20% reflectance, such as one-third the amount needed in the non-crystallized state; a different and broader infrared reflectance spectrum, such as a broad and intense peak at about 1300 nm and another peak in the 800 nm to 900 nm region, compared to a narrower and less intense infrared reflectance spectrum centered around the 800 nm to 1100 nm region in the non-crystalline state; a much greater retention of its percent infrared reflectance with more polymer is added to the infrared reflective layer or when another coating layer is coated or laminated to the infrared reflective layer, such as adding up to 90% polymer to the infrared reflective layer or overcoating with a silicone pressure sensitive adhesive layer, compared to the loss of nearly all infrared reflectance with 15% added polymer or significantly reduced infrared reflectance with overcoating, in the case of the non-crystalline state.

In one embodiment, the coating applied to the infrared reflective layer is a silicone pressure sensitive adhesive, and the solvent for this adhesive coating, such as heptane, is selected to minimize any dissolution of the infrared reflective layer during the coating and drying process. The crystalline state of the aminium radical cation compound in the infrared reflective layer makes it more resistant to dissolving in the solvents of most types of solvent coatings applied to it.

In one embodiment of the infrared reflective films of the present invention, the infrared reflective layer of the infrared film has an absorption peak in the range of 800 to 900 nm. This is a typical infrared wavelength range for detection by infrared scanners or cameras, and 700 to 900 nm is the most intense part of the infrared spectrum of sunlight where it is desirable to have energy control or blocking to reduce the heat buildup in the interior of the building or vehicle. In one embodiment, the absorption of the infrared reflective layer of the infrared film in the range of 420 to 680 nm is less than 20% of the absorption at the absorption peak in the range of 800 to 900 nm and, preferably, is less than 10% of the absorption at the absorption peak in the range of 800 to 900 nm, and more preferably, is less than 10% of the absorption at an absorption peak in the range of 830 to 860 nm. IR-165 type aminium radical cation compounds in a crystalline state are particularly suitable for meeting and maintaining these desired absorption properties.

Another aspect of the infrared reflective films of this invention pertains to the at least one infrared reflective layer comprising an aminium radical cation compound in a crystalline state and an organic polymer selected from the group consisting of an aliphatic urethane polymer, a divinyl ether polymer, a fluoropolymer, and a silicone polymer. In one embodiment, the divinyl ether polymer is selected from the group of polymers of the divinyl ethers of ethylene glycol, diethylene glycol, triethylene glycol, tetraethylene glycol, 1,4-butanediol, and 1,4-cyclohexanedimethanol. While not wishing to be bound by a particular theory, it is believed that the aminium radical cation compound with its cationic groups catalyzes the cationic polymerization of the monomer of divinyl ether compounds to form a polymer of the divinyl ether compounds. One approach to provide the divinyl ether polymer is to include the monomer of the divinyl ether polymer compound in the coating formulation of the aminium radical cation compound and organic solvents, such as 2-butanone and cyclohexanone, to make the infrared reflective layer and retaining a portion of the divinyl ether compound in a polymer state after drying and heating the layer, while some of the monomer is volatilized and removed during the drying and heating. In one embodiment, the at least one infrared reflective layer comprises an aliphatic urethane such as, for example, IROCOAT CA-239, the trade name for an aliphatic urethane available from Huntsman Corporation. The aliphatic urethane polymer adds cohesive and adhesive strength to the infrared reflective layer. In one embodiment, the at least one infrared reflective layer comprises a fluoropolymer such as, for example, Kynar 9037, a tradename for a polyvinylidene fluoride polymer available from Dupont Corporation, Wilmington, Del. The fluoropolymer adds resistance to moisture that increases the stability of the infrared reflective layer. The fluoropolymer also improves the flow properties and uniformity of the coating of the infrared reflective layer. In one embodiment, the at least one infrared reflective layer comprises a silicone polymer such as a dimethylpolysiloxane. The silicone polymer adds resistance to moisture that increases the stability of the infrared reflective layer. The silicone polymer also improves the flow properties and uniformity of the coating of the infrared reflective layer. In one embodiment, the at least one infrared reflective layer comprises a combination of two or more organic polymers selected from the group consisting of an aliphatic urethane polymer, a divinyl ether polymer, a fluoropolymer, and a silicone polymer.

Another aspect of the infrared reflective films of the present invention relates to the layer comprising a silicone polymer that is in contact with the infrared reflective layer, wherein the silicone polymer is a dimethylpolysiloxane, and preferably a dimethylpolysiloxane pressure sensitive adhesive, and more preferably, a dimethylpolysiloxane pressure sensitive adhesive comprising at least 90 percent by weight of the layer comprising a silicone polymer.

Another aspect of the infrared films of the present invention relates to the substrate comprising a transparent substrate, preferably a transparent polyester film, and more preferably, a transparent polyester film comprising an ultraviolet absorbing compound, or combination of compounds, that provides greater than 98% absorption in the wavelength range from 310 nm to 370 nm, and preferably greater than 99 percent absorption. In one embodiment, the substrate comprises a reflective opaque substrate, preferably a white polyester film such as, for example, MELINEX 339, a trade name for a polyester film from Dupont Corporation, Wilmington, Del., that comprises barium sulfate pigment particles that reflect infrared and visible radiation. The reflective opaque substrate is useful in providing a background of high infrared reflectance against which the infrared film with its blocking and reflectance of the infrared radiation in the initial pass through the layer comprising the aminium radical cation compound and in the return pass through this layer after reflecting off of the substrate, can be readily detected by an infrared scanner or camera, even at very low amounts of the aminium compound in the infrared reflective layer, such as less than 0.05 g/m$^2$.

One aspect of the infrared reflective films of this invention pertains to solar control window films comprising the infrared reflective films of the present invention. In one embodiment, the solar control window films comprise an infrared reflective film comprising (a) a first substrate comprising a transparent polyester film, (b) a first layer comprising an aminium radical cation compound in a crystalline state and an organic polymer, (c) a second layer comprising a silicone polymer, wherein the second layer is in contact with the first layer on one surface, and (d) a second substrate comprising a transparent polyester film, wherein the second substrate is on the side of the second layer opposite to the side in contact with the first layer. In one embodiment, the crystalline state is characterized by the presence of crystals of the aminium radical cation compound and by a shift of one or more low percent transmittance peaks in the infrared spectrum of the aminium radical cation compound in the crystalline state by at least 100 nm to the long wavelength side from the minimum percent transmittance peak of the infrared spectrum of the aminium radical cation compound in a state of single, non-crystallized molecules in a $10^{-5}$M solution in 2-butanone. In one embodiment, the crystalline state is further characterized by a shift of one or more low percent transmittance peaks in the infrared spectrum of the aminium radical cation compound in the crystalline state by at least 50 nm to the short wavelength side from the minimum percent transmittance peak of the infrared spectrum of the aminium radical cation compound in a state of single, non-crystallized molecules in a $10^{-5}$M solution in 2-butanone. For example, with IR-165 as the aminium radical cation compound, the infrared reflective layer typically exhibits a large broad minimum transmittance peak at about 1300 nm and a more narrow minimum transmittance peak at about 850 nm. IR-165 in a state of single, non-crystallized molecules in a $10^{-5}$M solution in 2-butanone or in a non-crystalline coating layer exhibits a single minimum transmittance peak at about 950 nm. Thus, the crystalline state for an infrared reflective coating comprising the IR-165 type of aminium radical cation compound typically has minimum transmittance peaks at about 850 nm and 1300 nm, or about 100 nm to the short wavelength side and 350 nm to the long wavelength side from the minimum transmittance peak in the infrared spectrum of the IR-165 in a solution or in a coating layer where the IR-165 is in a state of single, non-crystallized molecules. In one embodiment, the infrared reflective films exhibit a reflectance peak in the infrared region from 1250 nm to 1700 nm.

The solar control window films of this invention may have any of the design configurations known in the art for solar control window films. For example, the substrate may have a mounting adhesive layer coated on the side of a first substrate opposite to the infrared reflective layer. Upon wetting with water, this mounting adhesive layer may be utilized to mount or adhere the window film to a window. The non-metallic nature of the infrared reflective layers of this invention have an advantage of allowing the water to diffuse and dry much more rapidly than window films that have metallized layers that are much less permeable to water. Also, for example, the infrared reflective layer may be laminated to a second substrate by utilizing a pressure sensitive adhesive. In the solar control window films of the present invention, the pressure sensitive adhesive is a silicone pressure sensitive adhesive that provides greater stability to degradation by sunlight and moisture and combinations thereof than is provided by acrylic and other non-silicone pressure sensitive adhesives that are less water repellent and typically have a greater tendency to dissolve or migrate into the infrared reflective layers of this invention. The lamination of the two substrates together provides additional protection against handling and environmental damage to the infrared reflective layer which is then encapsulated between two substrates rather than being directly exposed in the inside of the building, automobile, or whatever structure to which the window film is attached. For added protection of the solar control window film against scratching or other types of damage to the optical clarity, the opposite side of this second substrate may be coated with an abrasion resistant coating, such as, for example, an UV-cured crosslinked acrylic coating. The order of the coating layers between the two substrates is optional. For example, the infrared reflective layer may be coated on the second substrate or coated on both the first and the second substrates, and the silicone pressure sensitive adhesive coating layer may be interposed between the first substrate and the infrared reflective layer on the second substrate.

In still another aspect of the solar control window films of this invention comprising infrared reflective films, the thickness of the first or infrared reflective layer is 0.01 to 0.1 microns. In one embodiment, the average width and depth of the crystals of the aminium radical cation compound are less than the thickness of the first layer. In one embodiment, the average length of the crystals of the aminium radical cation compound is greater than the thickness of the first layer. The dimensions of the crystals may be measured under a high power microscope or, even more accurately, by a scanning electron microcscope (SEM). The thickness of the infrared reflective coating may be measured by cross-sectioning the infrared reflective layer and the substrate and then measuring the thickness using a SEM. This cross-sectioning process also provides measurements on the depth and the length of the crystals, as well as measuring the depth or thickness of the first layer.

In another aspect of the solar control window films of this invention comprising infrared reflective films, the thickness of the first or infrared reflective layer is 0.1 to 0.3 microns. In one embodiment, the average width and depth of the crystals of the aminium radical cation compound are less than the thickness of the first layer. In one embodiment, the average length of the crystals of the aminium radical cation compound is greater than the thickness of the first layer.

In a further aspect of the solar control window films of the present invention, the percent haze of the window films is less than 3 percent, and preferably less than 2 percent. The formation of crystals of the aminium radical cation compound increases the haze of the coating since typically at least one of the dimensions of the crystals is 0.2 micron or higher. Although the percent haze in darker, less visibly transparent window films, such as those with a visible light transmittance below about 60%, is less noticeable, a haze level above about 3 percent is undesirable in low color window films with a visible light transmittance above about 60%.

To minimize the haze level, the thickness of the infrared reflective layer may be reduced to make the sizes of the crystals lower. Also, for lower haze, it is preferable to form the crystals during the initial drying step for the infrared reflective layer, such as by a solvent-induced crystallization, rather than forming the crystals by a post-heating process. Another approach to lowering the haze is to put an overcoating or laminate a layer, such as a pressure sensitive adhesive layer, on the infrared reflective layer. In one embodiment of the present invention, the pressure sensitive adhesive layer is a silicone pressure sensitive adhesive, preferably a dimethylpolysiloxane pressure sensitive adhesive, in a hydrocarbon solvent, such as heptane that does not dissolve or otherwise attack the crystals or the organic polymer in the first layer. This pressure sensitive adhesive may be applied directly to the first layer or may be coated on the second substrate and then laminated to the first layer. A combination of these approaches may be used to obtain a lower haze level.

In another aspect of the solar control window films of this invention, the infrared reflective layer comprises from 70 percent to 99 percent by weight of the aminium radical cation compound in a crystalline state. In one embodiment, the infrared reflective layer comprises 10 to 70 percent by weight of the aminium radical cation compound in a crystalline state. The remainder of the infrared reflective layer may be one or more organic polymers. The crystalline state of the aminium radical cation compound allows a large weight percent of organic polymers and other coating materials to be combined with the aminium radical cation compound without significantly reducing the infrared reflectance, whereas typically not more than 15 percent by weight of polymers and other additives may be added to the non-crystalline state of the same aminium radical cation compound without eliminating most of the infrared reflectance of the layer.

In another aspect of the solar control window films of the present invention, the maximum infrared reflectance peak of the first or infrared reflective layer is greater than 20 percent reflectance, and preferably greater than 30 percent reflectance. In one embodiment, the maximum infrared reflectance of the first or infrared reflective layer is in the infrared region from 1250 nm to 1400 nm.

Another aspect of this invention pertains to security markings comprising the infrared reflective films of the present invention. In one embodiment, the security markings comprise an infrared reflective film comprising a substrate and at least one infrared reflective layer, wherein the infrared reflective layer comprises an aminium radical cation compound in a crystalline state and an organic polymer and has a reflectance peak in the infrared region from 1250 nm to 1700 nm, and wherein the infrared reflective layer is in contact with a layer comprising a silicone polymer.

Still another aspect of this invention pertains to an optical article comprising the infrared reflective films of the present invention. In one embodiment, the optical article comprises an infrared reflective film comprising a substrate and an infrared reflective layer, wherein the infrared reflective layer comprises an aminium radical cation compound in a crystalline state and an organic polymer, wherein the infrared reflective layer has a reflectance peak in the infrared region from 1250 nm to 1700 nm, and wherein the infrared reflective layer is in contact with a layer comprising a silicone polymer. Optical articles include, but are not limited to, solar control window films, security markings and security marking systems, test strips for analysis of fluids, photovoltaic cells, infrared blocking films for outdoor kiosks and other displays, transparent credit cards, infrared filters, and other applications where the article may be detected or utilized optically in the infrared region. In one embodiment, the infrared reflective film comprises a laser imaged pattern in the infrared reflective layer comprising the aminium radical cation compound, wherein the infrared absorption of the aminium radical cation compound has been changed by exposure to a laser and the laser imaged pattern is readable in the infrared region. Typically, the laser is an infrared laser, such as, for example, a semiconductor diode laser emitting at 830 nm or a YAG laser emitting at 1065 nm. In one embodiment, the laser imaged pattern is readable in the eye-safe region above 1400 nm. This broad infrared range for detection from 700 nm to 1600 nm, and higher depending on the choice of the aminium radical cation compound, is useful in providing an option for reading the infrared film at an eye-safe wavelength so that, for example, it could be read with an infrared laser device at a store checkout counter or in a crowded room without concern about harming any of the people present.

Another aspect of the present invention relates to a method of making an infrared reflective film, wherein the method comprises the steps of providing (a) a substrate comprising a transparent polyester film, (b) a first or infrared reflective layer overlying the substrate, wherein the first layer comprises an aminium radical cation compound in a crystalline state and an organic polymer, (c) a second layer comprising a silicone polymer, wherein the second layer is in contact with the first layer on one surface, and (d) a second substrate comprising a transparent polyester film, wherein the second substrate is on the side of the second layer opposite to the side in contact with the first layer.

Infrared Reflective Films for Solar Control Window Films

This invention additionally pertains to solar control window films that have strong infrared reflectance while utilizing infrared absorbing layers having low color and high stability but little or no infrared reflectance. As used herein, the words "film" or "films" pertain to any article or product that comprises at least one layer that is a clear or transparent film substrate such as, for example, a transparent polyethylene terephthalate, herein called polyester, film, a transparent polycarbonate film, a transparent polypropylene film, and a transparent polyvinyl chloride (PVC) film. For example, the infrared reflective films and solar control window films of this invention may include configurations where a transparent plastic or polymer film is laminated to a transparent glass substrate or to another transparent plastic film.

One aspect of this invention pertains to a solar control window film comprising an infrared reflective film comprising (a) a first transparent substrate, (b) an infrared reflective layer comprising an aminium radical cation compound in a crystalline state and an organic polymer, wherein the maximum reflectance peak of the infrared reflective layer from 1250 nm to 1700 nm exhibits greater than 20 percent reflectance, (c) a second transparent substrate, wherein the second substrate is on the side of the infrared reflective layer opposite to the first substrate, and (d) an infrared absorbing layer comprising an infrared absorbing compound, wherein the maximum infrared reflectance peak of the infrared absorbing layer exhibits less than 10 percent reflectance, and wherein the infrared reflective layer is interposed between the first substrate and the infrared absorbing layer. In one embodiment, the maximum infrared reflectance peak of the infrared absorbing layer exhibits less than 5 percent reflectance. In one embodiment, the window film further comprises a polymer layer, wherein the polymer layer comprises a silicone polymer and is in contact with the infrared reflective layer on a first surface of the polymer layer. In one embodiment, the first substrate and the second substrate are laminated together and the infrared reflective layer and the polymer layer are interposed between the first and the second substrates. In one embodiment, the silicone polymer comprises a silicone pressure sensitive adhesive. In one embodiment, the weight percent of silicone polymer in the layer comprising a silicone is greater than 20%, and preferably greater than 90%. In one embodiment, the infrared absorbing layer is interposed between the infrared reflective layer and the second substrate. In one embodiment, the infrared absorbing layer is on the side of the second substrate opposite from the infrared reflective layer.

In another aspect of the solar control window films of this invention, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation.

The crystalline state of the aminium radical cation compound, instead of any of its non-crystallized states, provides additional stability to the optical properties of the infrared film under storage conditions and under extended exposure to heat, light, and moisture. The crystalline state of the aminium radical cation compound means that the aminium radical cation compound has formed crystals in the infrared reflective layer. These crystals can be observed under a high power microscope or, in the case of clear transparent infrared films, can also be seen by an increase in the percent haze due to the formation of crystals. The crystalline state of the aminium radical cation compound, such as IR-165, can be formed by extended heating of the infrared reflective layer at high temperatures, such as at 130° C., or by including a high boiling solvent, such as 2,4-pentanedione, with limited solubility for the aminium radical cation compound in the coating formulation. This high boiling solvent causes the aminium radical cation compound to precipitate out or crystallize in the last stages of drying, thereby forming the aminium radical cation compound in a crystalline state in the infrared reflective layer.

Besides increased stability to light and to other environmental aging conditions, other benefits of having the crystalline state of the aminium radical cation compound in the infrared reflective layer are higher percent reflectance in the infrared, such as 35% reflectance compared to 20% reflectance in the non-crystallized state; a lower amount of aminium radical cation compound required to obtain at least a 20% reflectance, such as one-third the amount needed in the non-crystallized state; a different and broader infrared reflectance spectrum, such as a broad and intense peak at about 1300 nm and another peak in the 800 nm to 900 nm region, compared to a narrower and less intense infrared reflectance spectrum centered around the 800 nm to 1100 nm region in the non-crystalline state; a much greater retention of its percent infrared reflectance with more polymer is added to the infrared reflective layer or when another coating layer is coated or laminated to the infrared reflective layer, such as adding up to 90% polymer to the infrared reflective layer or overcoating with a pressure sensitive adhesive layer, compared to the loss of nearly all infrared reflectance with 15% added polymer or significantly reduced infrared reflectance with overcoating, in the case of the non-crystalline state.

In one embodiment, the coating applied to the infrared reflective layer is a silicone pressure sensitive adhesive, and the solvent for this adhesive coating, such as heptane, is selected to minimize any dissolution of the infrared reflective layer during the coating and drying process. The crystalline state of the aminium radical cation compound in the infrared reflective layer makes it more resistant to dissolving in the solvent of most types of solvent coatings applied to it.

In one embodiment of the solar control window films of the present invention, the infrared reflective layer has an absorption peak in the range of 800 to 900 nm. 700 to 900 nm is the most intense part of the infrared spectrum of sunlight where it is desirable to have energy control or blocking to reduce the heat buildup in the interior. In one embodiment, the absorption of the infrared reflective layer in the range of 420 to 680 nm is less than 20% of the absorption at the absorption peak in the range of 800 to 900 nm and, preferably, is less than 10% of the absorption at the absorption peak in the range of 800 to 900 nm, and more preferably, is less than 10% of the absorption at an absorption peak in the range of 830 to 860 nm. IR-165 type aminium radical cation compounds in a crystalline state are particularly suitable for meeting and maintaining these desired absorption properties.

Another aspect of the solar control window films of this invention pertains to the infrared reflective layer comprising an aminium radical cation compound in a crystalline state and an organic polymer selected from the group consisting of an aliphatic urethane polymer, a divinyl ether polymer, a fluoropolymer, and a silicone polymer. In one embodiment, the divinyl ether polymer is selected from the group of polymers of the divinyl ethers of ethylene glycol, diethylene glycol, triethylene glycol, tetraethylene glycol, 1,4-butanediol, and 1,4-cyclohexanedimethanol. While not wishing to be bound by a particular theory, it is believed that the aminium radical cation compound with its cationic groups catalyzes the cationic polymerization of the monomer of divinyl ether compounds to form a polymer of the divinyl ether compounds. One approach to provide the divinyl ether polymer is to include the monomer of the divinyl ether polymer compound in the coating formulation of the aminium radical cation compound and organic solvents, such as 2-butanone and cyclohexanone, to make the infrared reflective layer and retaining a portion of the divinyl ether compound in a polymer state after drying and heating the layer, while some of the monomer is volatilized and removed during the drying and heating. In one embodiment, the infrared reflective layer comprises an aliphatic urethane such as, for example, IRO-COAT CA-239, the trade name for an aliphatic urethane polymer available from Huntsman Corporation. The aliphatic urethane polymer adds cohesive and adhesive strength to the infrared reflective layer. In one embodiment, the infrared reflective layer comprises a fluoropolymer such as, for example, KYNAR 9037, the trade name for a polyvinylidene fluoride polymer available from Dupont Corporation, Wilmington, Del. The fluoropolymer adds resistance to moisture that increases the stability of the infrared reflective layer. The fluoropolymer also improves the flow properties and uniformity of the coating of the infrared reflective layer. In one embodiment, the infrared reflective layer comprises a silicone polymer such as a dimethylpolysiloxane. The silicone polymer adds resistance to moisture that increases the stability of the infrared reflective layer. The silicone polymer also improves the flow properties and uniformity of the coating of the infrared reflective layer. In one embodiment, the infrared reflective layer comprises a combination of two or more organic polymers selected from the group consisting of an aliphatic urethane polymer, a divinyl ether polymer, a fluoropolymer, and a silicone polymer, preferably a combination of an aliphatic urethane polymer and a divinyl ether polymer.

Another aspect of the solar control window films of the present invention relates to the layer comprising a silicone polymer that is in contact with the infrared reflective layer, wherein the silicone polymer is a dimethylpolysiloxane, and preferably a dimethylpolysiloxane pressure sensitive adhesive, and more preferably, a dimethylpolysiloxane pressure sensitive adhesive comprising at least 90 percent by weight of the layer comprising a silicone polymer.

Another aspect of the solar control window films of the present invention relates to the first substrate, and optionally the second substrate, comprising a transparent substrate, preferably a transparent polyester film, and more preferably, a transparent polyester film comprising an ultraviolet absorbing compound, or combination of compounds, that provides greater than 90% absorption in the wavelength range from 310 nm to 370 nm, preferably greater than 98% absorption, and, more preferably, greater than 99 percent absorption.

Still another aspect of this invention relates to the very low amounts of crystalline aminium radical cation compound, such as IR-165, that are capable of providing greater than a 20% reflectance at their maximum infrared reflectance peak, typically in the range of 1250 nm to 1400 nm. For example, even very low amounts of the aminium compound, such as IR-165, in the infrared reflective layer, such as less than 0.05 g/m$^2$, are capable of providing this level of infrared reflectance. This is useful in reducing the cost and the visible color of the solar control window film and also provides sufficient infrared reflectance, to allow a combination with an infrared absorbing layer having little or no infrared reflectance to make a solar control window film with excellent blocking of the sun's infrared radiation with acceptable solar heat gain or buildup. By placing the infrared reflective layer as the first infrared blocking layer that the sunlight reaches, a significant amount of the sun's infrared radiation, such as, for example, 15 to 25%, is reflected before the sunlight subsequently reaches the infrared absorbing layer. This prevents excessive solar heat gain or buildup that may result in cracking or breaking of the windows.

In one embodiment of the solar control window films of this invention, the crystalline state is characterized by the presence of crystals of the aminium radical cation compound and by a shift of one or more low percent transmittance peaks in the infrared spectrum of the aminium radical cation compound in the crystalline state by at least 100 nm to the long wavelength side from the minimum percent transmittance peak of the infrared spectrum of the aminium radical cation compound in a state of single, non-crystallized molecules in a 10$^{-5}$M solution in 2-butanone. In one embodiment, the crystalline state is further characterized by a shift of one or more low percent transmittance peaks in the infrared spectrum of the aminium radical cation compound in the crystalline state by at least 50 nm to the short wavelength side from the minimum percent transmittance peak of the infrared spectrum of the aminium radical cation compound in a state of single, non-crystallized molecules in a 10$^{-5}$M solution in 2-butanone. For example, with IR-165 as the aminium radical cation compound, the infrared reflective layer typically exhibits a large broad minimum transmittance peak at about 1300 nm and a more narrow minimum transmittance peak at about 850 nm. IR-165 in a state of single, non-crystallized molecules in a 10$^{-5}$M solution in 2-butanone or in a non-crystalline coating layer exhibits a single minimum transmittance peak at about 950 nm. Thus, the crystalline state for an infrared reflective coating comprising the IR-165 type of aminium radical cation compound typically has minimum transmittance peaks at about 850 nm and 1300 nm, or about 100 nm to the short wavelength side and 350 nm to the long wavelength side from the minimum transmittance peak in the infrared spectrum of the IR-165 in a solution or in a coating layer where the IR-165 is in a state of single, non-crystallized molecules. In one embodiment, the infrared reflective layer exhibits a reflectance peak in the infrared region from 1250 nm to 1700 nm.

The solar control window films of this invention may have any of the design configurations known in the art for solar control window films. For example, the substrate may have a mounting adhesive layer coated on the side of a first substrate opposite to the infrared reflective layer. This mounting adhesive layer may comprise ultraviolet absorbing compounds that reduce the amount of ultraviolet radiation that enters the building, vehicle, or other structure being protected by the solar control window film. Upon wetting with water, this mounting adhesive layer may be utilized to mount or adhere the window film to a window. The non-metallic nature of the infrared reflective layers of this invention have an advantage of allowing the water to diffuse and dry much more rapidly than window films that have metallized layers that are much less permeable to water. Also, for example, the infrared reflective layer may be laminated to a second substrate by utilizing a pressure sensitive adhesive.

In the solar control window films of the present invention, the pressure sensitive adhesive is preferably a silicone pressure sensitive adhesive that provides greater stability to degradation by sunlight and moisture and combinations thereof than is provided by acrylic and other non-silicone pressure sensitive adhesives that are less water repellent and typically have a greater tendency to dissolve or migrate into the infrared reflective layers of this invention. The lamination of the two substrates together provides additional protection against handling and environmental damage to the infrared reflective layer which is then encapsulated between two substrates rather than being directly exposed in the inside of the building, automobile, or whatever structure to which the window film is attached. For added protection of the solar control window film against scratching or other types of damage to the optical clarity, the opposite side of this second substrate may be coated with an abrasion resistant coating, such as, for example, an UV-cured crosslinked acrylic coating. This abrasion resistant coating may comprise the infrared absorbing compound and thus may also function as the infrared absorbing layer, as well as functioning as an abrasion resistant layer. Alternatively, the infrared absorbing layer may be coated on the opposite side of the second substrate from the abrasion resistant coating. In the solar control window films of this invention, the infrared reflective layer is configured so that the solar radiation reaches the infrared reflective layer before it reaches the infrared absorbing layer. The order of the coatings of the infrared reflective coating and the pressure sensitive adhesive coating between the two substrates is optional. For example, the infrared reflective coating may be coated on the first or the second substrate or coated on both the first and the second substrates, and the pressure sensitive adhesive coating may be interposed between the first substrate and the infrared reflective layer on the second substrate.

In still another aspect of the solar control window films of this invention comprising infrared reflective films, the thickness of the first or infrared reflective layer is 0.01 to 0.1 microns. In one embodiment, the average width and depth of the crystals of the aminium radical cation compound are less than the thickness of the first layer. In one embodiment, the average length of the crystals of the aminium radical cation compound is greater than the thickness of the first layer. The dimensions of the crystals may be measured under a high power microscope or, even more accurately, by a scanning electron microcscope (SEM). The thickness of the infrared reflective coating may be measured by cross-sectioning the infrared reflective layer and the substrate and then measuring the thickness using a SEM. This cross-sectioning process also provides measurements on the depth and the length of the crystals, as well as measuring the depth or thickness of the first layer.

In another aspect of the solar control window films of this invention comprising infrared reflective films, the thickness of the first or infrared reflective layer is 0.1 to 0.3 microns. In one embodiment, the average width and depth of the crystals of the aminium radical cation compound are less than the thickness of the first layer. In one embodiment, the average length of the crystals of the aminium radical cation compound is greater than the thickness of the first layer.

In a further aspect of the solar control window films of the present invention, the percent haze of the window films is less than 3 percent, and preferably less than 2 percent. The formation of crystals of the aminium radical cation compound increases the haze of the coating since typically at least one of the dimensions of the crystals is 0.2 micron or higher. Although the percent haze in darker, less visibly transparent window films, such as those with a visible light transmittance below about 60%, is less noticeable, a haze level above about 3 percent is undesirable in low color window films with a visible light transmittance above about 60%.

To minimize the haze level, the thickness of the infrared reflective layer may be reduced to make the sizes of the crystals lower. Also, for lower haze, it is preferable to form the crystals during the initial drying step for the infrared reflective layer, such as by a solvent-induced crystallization, rather than forming the crystals by a post-heating process. Another approach to lowering the haze is to put an overcoating or laminate a layer, such as a pressure sensitive adhesive layer, on the infrared reflective layer. In one embodiment of the present invention, the pressure sensitive adhesive layer is a silicone pressure sensitive adhesive, preferably a dimethylpolysiloxane pressure sensitive adhesive, in a hydrocarbon solvent, such as heptane, that does not dissolve or otherwise attack the crystals or the organic polymer in the first layer. This pressure sensitive adhesive may be applied directly to the first layer or may be coated on the second substrate and then laminated to the first layer. A combination of these approaches may be used to obtain a lower haze level.

In another aspect of the solar control window films of this invention, the infrared reflective layer comprises from 70 percent to 99 percent by weight of the aminium radical cation compound in a crystalline state. In one embodiment, the infrared reflective layer comprises 10 to 70 percent by weight of the aminium radical cation compound in a crystalline state. The remainder of the infrared reflective layer may be one or more organic polymers. The crystalline state of the aminium radical cation compound allows a large weight percent of organic polymers and other coating materials to be combined with the aminium radical cation compound without significantly reducing the infrared reflectance, whereas typically not more than 15 percent by weight of polymers and other additives may be added to the non-crystalline state of the same aminium radical cation compound without eliminating most of the infrared reflectance of the layer.

In another aspect of the solar control window films of the present invention, the maximum infrared reflectance peak of the first or infrared reflective layer is greater than 20 percent reflectance, and preferably greater than 30 percent reflectance. In one embodiment, the maximum infrared reflectance of the first or infrared reflective layer is in the infrared region from 1250 nm to 1400 nm.

In still another aspect of the solar control window films of this invention, the infrared absorbing layer comprises an infrared absorbing compound selected from the group consisting of aminium radical cation compounds, tin oxides, lanthanum boride, and cesium tungsten oxide. In one embodiment, the infrared absorbing compound is an antimony-doped tin oxide. In one embodiment, the infrared absorbing compound is a fluorine-doped tin oxide. In one embodiment, the infrared absorbing compound is an indium-doped tin oxide. In one embodiment, the infrared absorbing compound is lanthanum boride. In one embodiment, the infrared absorbing compound is cesium tungsten oxide. Other suitable infrared absorbing compounds include those infrared absorbing compounds known in the art of infrared absorptive layers with little or no reflection for transparent credit cards and other infrared blocking applications where little or no infrared reflectance is necessary.

Another aspect of the present invention relates to methods of making a solar control window film, wherein the method comprises the steps of providing (a) a first substrate comprising a transparent polyester film, (b) an infrared reflective layer overlying the first substrate, wherein the first layer comprises an aminium radical cation compound in a crystalline state and an organic polymer, wherein the maximum reflectance peak of the infrared reflective layer from 1250 nm to 1700 nm is greater than 20 percent reflectance, (c) a second substrate comprising a transparent polyester film, wherein the second substrate is on the side of the infrared reflective layer opposite to the first substrate, and (d) an infrared absorbing layer comprising an infrared absorbing compound, wherein the maximum infrared reflectance peak of the infrared absorbing layer is less than 10 percent reflectance, and wherein the infrared reflective layer is interposed between the first substrate and the infrared absorbing layer. These methods provide solar control window films with the infrared reflective layer receiving the solar radiation first and reflecting a significant amount of the solar infrared radiation, before the remaining solar radiation then reaches the infrared absorbing layer. This order of layers prevents excessive solar heat gain or buildup and allows infrared absorbing layers as described herein to be effectively utilized in solar control window films. In one embodiment, the maximum infrared reflectance peak of the infrared absorbing layer is less than 5 percent reflectance. In one embodiment, the method further comprises the step of providing a polymer layer, wherein the polymer layer comprises a silicone polymer and is in contact with the infrared reflective layer on one surface of the polymer layer. In one embodiment, the method further comprises the step of laminating the first substrate and the second substrate together and the infrared reflective layer and the polymer layer are interposed between the first and the second substrates. In one embodiment, the silicone polymer comprises a silicone pressure sensitive adhesive. In one embodiment, the infrared absorbing layer is interposed between the infrared reflective layer and the second substrate. In one embodiment, the infrared absorbing layer is on the side of the second substrate opposite to the first substrate.

What is claimed is:

1. An infrared reflective film comprising a substrate and an infrared reflective layer, wherein said infrared reflective layer comprises an aminium radical cation dye in a crystalline state and an organic polymer, wherein said infrared reflective layer has a reflectance peak in the infrared region from 1250 nm to 1700 nm, wherein said crystalline state is characterized by the presence of crystals and wherein the average length of said crystals is greater than the thickness of said infrared reflective layer.

2. The infrared reflective film of claim 1, wherein the thickness of said infrared reflective layer is 0.01 to 0.1 microns.

3. The infrared reflective film of claim 1, wherein the thickness of said infrared reflective layer is 0.1 to 0.3 microns.

4. The infrared reflective film of claim 1, wherein said aminium radical cation dye is a salt of an aminium radical cation, wherein the anion of said salt is selected from the group consisting of hexafluoroantimonate and hexafluorophosphate.

5. The infrared reflective film of claim 1, wherein said aminium radical cation dye is a salt of a tetrakis(phenyl)-1,4-benzenediamine radical cation.

6. The infrared reflective film of claim 1, wherein said aminium radical cation dye is a salt of a tris(phenyl)-aminium radical cation.

7. The infrared reflective film of claim 1, wherein said organic polymer is selected from the group consisting of an aliphatic urethane polymer, a divinyl ether polymer, a fluoropolymer, and a silicone polymer.

8. The infrared reflective film of claim 7, wherein said divinyl ether polymer is selected from the group of polymers of the divinyl ethers of ethylene glycol, diethylene glycol, triethylene glycol, tetraethylene glycol, 1,4-butanediol, and 1,4-cyclohexanedimethanol.

9. A solar control window film, wherein said window film comprises said infrared reflective film of claim 1.

10. A solar control window film, wherein said window film comprises an infrared reflective film comprising:
   a) a substrate comprising a transparent polyester film;
   b) an infrared reflective layer comprising an aminium radical cation dye in a crystalline state and an organic polymer,
   wherein said crystalline state is characterized by the presence of crystals of said aminium radical cation dye and by a shift of one or more low percent transmittance peaks in the infrared spectrum of said aminium radical cation dye in said crystalline state by at least 100 nm to the long wavelength side from the minimum percent transmittance peak of the infrared spectrum of said aminium radical cation dye in a state of single, non-crystallized molecules in a $10^{-5}$M solution in 2-butanone, and wherein the average length of said crystals of said aminium radical cation dye is greater than the thickness of said infrared reflective layer.

11. The solar control window film of claim 10, wherein said crystalline state is further characterized by a shift of one or more low percent transmittance peaks in the infrared spectrum of said aminium radical cation dye in said crystalline state by at least 50 nm to the short wavelength side from the minimum percent transmittance peak of the infrared spectrum of said aminium radical cation dye in a state of single, non-crystallized molecules in a $10^{-5}$M solution in 2-butanone.

12. The solar control window film of claim 10, wherein said infrared reflective film exhibits a reflectance peak in the infrared region from 1250 nm to 1700 nm.

13. The solar control window film of claim 10, wherein the thickness of said infrared reflective layer is 0.01 to 0.1 microns.

14. The solar control window film of claim 13, wherein the average width and depth of said crystals of said aminium radical cation dye are less than the thickness of said infrared reflective layer.

15. The solar control window film of claim 10, wherein the thickness of said infrared reflective layer is 0.1 to 0.3 microns.

16. The solar control window film of claim 15, wherein the average width and depth of said crystals of said aminium radical cation dye are less than the thickness of said infrared reflective layer.

17. The solar control window film of claim 10, wherein said infrared reflective layer comprises from 70 percent to 99 percent by weight of said aminium radical cation dye.

18. The solar control window film of claim 10, wherein the maximum infrared reflectance peak of said infrared reflective layer is greater than 30 percent reflectance.

19. A security marking, wherein said security marking comprises said infrared reflective film of claim 1.

20. An optical article, wherein said optical article comprises said infrared reflective film of claim 1.

21. The optical article of claim 20, wherein said infrared reflective film comprises a laser imaged pattern in said infrared reflective layer, wherein the infrared absorption of said aminium radical cation dye has been changed by exposure to the laser and said laser imaged pattern is readable in the infrared region.

22. The optical article of claim 21, wherein said laser imaged pattern is readable in the eye-safe region above 1400 nm.

* * * * *